(12) United States Patent
Gupta et al.

(10) Patent No.: US 8,625,539 B2
(45) Date of Patent: Jan. 7, 2014

(54) METHOD AND SYSTEM FOR SUPPLEMENTAL CHANNEL REQUEST MESSAGES IN A WIRELESS NETWORK

(75) Inventors: Rakesh Gupta, Kanata (CA); Asif Hossain, Kanata (CA)

(73) Assignee: BlackBerry Limited, Waterloo (CA)

(*) Notice: Subject to any disclaimer, the term of this patent is extended or adjusted under 35 U.S.C. 154(b) by 1126 days.

(21) Appl. No.: 12/575,958

(22) Filed: Oct. 8, 2009

(65) Prior Publication Data

US 2010/0085944 A1    Apr. 8, 2010

Related U.S. Application Data

(60) Provisional application No. 61/103,760, filed on Oct. 8, 2008.

(51) Int. Cl.
| | |
|---|---|
| *H04W 52/02* | (2009.01) |
| *H04W 52/46* | (2009.01) |
| *H04W 36/30* | (2009.01) |
| *H04W 36/24* | (2009.01) |

(52) U.S. Cl.
USPC ............................ 370/332; 370/311; 370/318

(58) Field of Classification Search
USPC .............. 370/311, 318, 331–334; 455/69, 70, 455/436–438, 522
See application file for complete search history.

(56) References Cited

U.S. PATENT DOCUMENTS

| | | | | |
|---|---|---|---|---|
| 5,689,815 A | * | 11/1997 | Yamazaki et al. ............... | 455/69 |
| 6,070,058 A | * | 5/2000 | Waldroup et al. ............... | 455/69 |
| 6,219,343 B1 | * | 4/2001 | Honkasalo et al. ........... | 370/335 |
| 6,236,863 B1 | * | 5/2001 | Waldroup et al. ............. | 455/522 |
| 6,757,541 B2 | | 6/2004 | Achour et al. | |
| 6,944,136 B2 | * | 9/2005 | Kim et al. ....................... | 370/260 |
| 6,961,320 B1 | * | 11/2005 | Swaminathan et al. ...... | 370/298 |
| 7,254,121 B2 | | 8/2007 | Kim et al. | |
| 7,283,482 B2 | | 10/2007 | Koo et al. | |
| 7,558,535 B2 | * | 7/2009 | Cho et al. ......................... | 455/69 |
| 7,570,621 B2 | * | 8/2009 | Garg ............................. | 370/335 |
| 8,255,207 B2 | * | 8/2012 | Vaillancourt et al. .......... | 704/219 |
| 2001/0012316 A1 | * | 8/2001 | Maruyama ..................... | 375/148 |
| 2001/0030948 A1 | * | 10/2001 | Tiedemann, Jr. ............. | 370/331 |
| 2002/0105923 A1 | * | 8/2002 | Nikides et al. ................ | 370/329 |
| 2002/0126739 A1 | * | 9/2002 | Tiedemann, Jr. et al. ..... | 375/141 |
| 2002/0137520 A1 | * | 9/2002 | Dillon et al. ................... | 455/453 |
| 2002/0151290 A1 | * | 10/2002 | Chen ............................. | 370/329 |
| 2002/0193134 A1 | * | 12/2002 | Kim ............................... | 455/522 |

(Continued)

FOREIGN PATENT DOCUMENTS

| | | |
|---|---|---|
| EP | 2031763 | 3/2009 |
| WO | 2004/068808 | 8/2004 |

OTHER PUBLICATIONS

European application No. 09172599.4, European Search Report, dated Mar. 18, 2010.

(Continued)

*Primary Examiner* — Ian N Moore
*Assistant Examiner* — Jenee Alexander
(74) *Attorney, Agent, or Firm* — Moffat & Co.

(57) ABSTRACT

A method and system for obtaining reverse channel resources for a mobile device, the method filtering a closed loop correction power value; calculating a data rate utilizing the filtered closed loop correction power value; and sending a supplemental channel request message, including the calculated data rate, to a base station transceiver system.

16 Claims, 8 Drawing Sheets

(56) References Cited

U.S. PATENT DOCUMENTS

| | | | |
|---|---|---|---|
| 2003/0002461 A1* | 1/2003 | Chaponniere et al. | 370/335 |
| 2003/0039267 A1 | 2/2003 | Koo et al. | |
| 2003/0050086 A1* | 3/2003 | Lee et al. | 370/465 |
| 2003/0054773 A1* | 3/2003 | Vanghi | 455/70 |
| 2003/0078010 A1* | 4/2003 | Davis | 455/69 |
| 2003/0133423 A1* | 7/2003 | LaDue | 370/330 |
| 2003/0176202 A1* | 9/2003 | Bartl et al. | 455/522 |
| 2004/0021595 A1* | 2/2004 | Erdogan et al. | 341/144 |
| 2004/0071132 A1* | 4/2004 | Sundqvist et al. | 370/352 |
| 2004/0170159 A1* | 9/2004 | Kim et al. | 370/352 |
| 2004/0198404 A1* | 10/2004 | Attar et al. | 455/522 |
| 2004/0213293 A1* | 10/2004 | Basso et al. | 370/480 |
| 2004/0258024 A1* | 12/2004 | Tiedemann et al. | 370/332 |
| 2005/0014523 A1* | 1/2005 | Pi et al. | 455/522 |
| 2005/0113104 A1* | 5/2005 | Chen et al. | 455/452.1 |
| 2006/0002348 A1* | 1/2006 | Chaponniere et al. | 370/335 |
| 2006/0142044 A1* | 6/2006 | Sung | 455/522 |
| 2006/0223457 A1* | 10/2006 | Rahman | 455/78 |
| 2006/0235692 A1* | 10/2006 | Mukhtar et al. | 704/260 |
| 2007/0142074 A1* | 6/2007 | Black et al. | 455/522 |
| 2008/0207250 A1* | 8/2008 | Park et al. | 455/522 |
| 2008/0220806 A1 | 9/2008 | Shin et al. | |
| 2009/0117931 A1 | 5/2009 | Shin et al. | |
| 2011/0125505 A1* | 5/2011 | Vaillancourt et al. | 704/500 |

OTHER PUBLICATIONS

Dyaptive Systems Inc., "DMTS-8000 Assisted Data Service Rollout in CDMA2000 Networks (Revision 1)", Apr. 13, 2005.

ARIB STD-T64-C.S0062-0 v1.0—Signaling Conformance Test Specification for cdma2000 Data Service, prepared by 3GPP2-WG of Association of Radio Industries and Businesses (ARIB) based upon C.50062-0 Version 1.0.

Sartori et al., Improving the Uplink Data Rate of Portable Devices in Broadband Systems with Relaying, http://www.priorartdatabase.com/IPCOM/000141199.

Telecommunications Industry Association, "TIA Standard: Signaling conformance Tests for cdma2000 Spread Spectrum Systems TIA/EIA-898".

Canadian patent application No. 2,681,988, office action dated Oct. 18, 2011.

\* cited by examiner

METHOD AND SYSTEM FOR SUPPLEMENTAL CHANNEL REQUEST MESSAGES IN A WIRELESS NETWORK

RELATED APPLICATIONS

The present application claims priority from U.S. Provisional Application No. 61/103,760, filed Oct. 8, 2008, the contents of which are herein incorporated by reference.

FIELD OF THE APPLICATION

The present disclosure relates to channel request messages in communications systems, and in one example to supplemental channel request messages in a code division multiple access (CDMA) system.

BACKGROUND

In communication systems, typically downlink data is provided with much more bandwidth than uplink data. When a user is required to send significant information from a mobile device to a base station, resources are typically requested.

One way to do this, as indicated in U.S. Pat. No. 6,757,541 to Achour et al., the contents of which are incorporated herein by reference, uses a reverse supplemental channel (R-SCH) for the mobile device, the R-SCH being assigned a data rate.

Supplemental Channel Request Messages (SCRM) are sent in the uplink asking for a given reverse supplemental channel with a defined data rate. In a conventional approach which implements a CDMA stack, the rate is determined periodically, for example, every one to five seconds. Field tests of devices implementing the code have found that, in some instances, the device requests a lower rate than that which the device is capable of achieving based on its power and traffic conditions.

BRIEF DESCRIPTION OF THE DRAWINGS

The present disclosure will be better understood with reference to the drawings in which.

DETAILED DESCRIPTION

The present disclosure provides a method for obtaining reverse channel resources for a mobile device comprising: filtering a closed loop correction power value; calculating a data rate utilizing the filtered closed loop correction power value; and sending a supplemental channel request message, including the calculated data rate, to a base station transceiver system.

The present disclosure further provides a mobile device configured to obtain reverse channel resources, the mobile device comprising: a processor configured to: filter a closed loop correction power value; and calculate a data rate utilizing the filtered closed loop correction power value; and a communications subsystem configured to send a supplemental channel request message, including the calculated data rate, to a base station transceiver system.

A better correlation between the network conditions and rate requested is required in order to optimize device performance. As will be appreciated by those in the art, the requesting of a lower data rate than a device is capable of achieving based on power and channel conditions results in poor mobile device performance.

The present disclosure is described below with regard to CDMA networks and in particular to supplemental channel request messages in CDMA networks. However, the present disclosure is not limited to CDMA networks, and the methods and apparatus described herein could equally be used for channel resource messages in, for example, Global System for Mobile communications (GSM), Universal Mobile Telecommunications System (UMTS), Long Term Evolution (LTE), or other networks.

Figure 1:
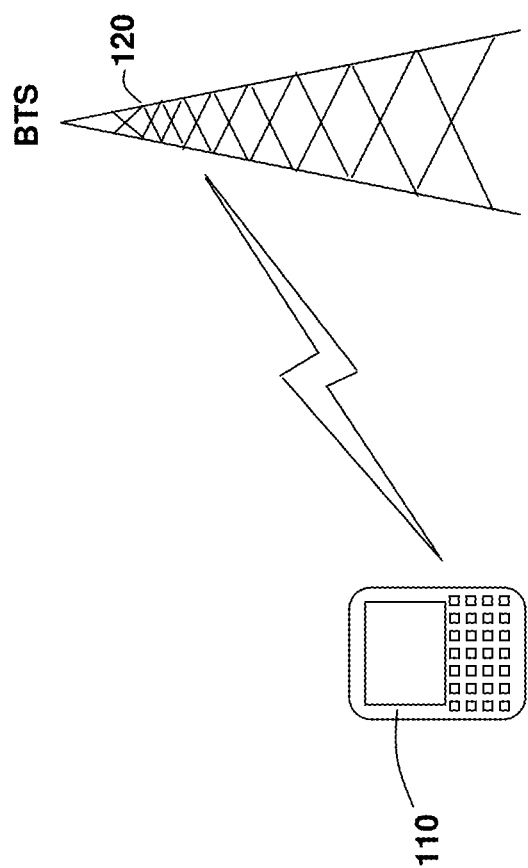
FIG. 1 is a block diagram of a mobile device communicating with a base station transceiver system.

Reference is now made to FIG. 1. From a mobile device 110, a supplemental channel request message (SCRM) is sent to a base station transceiver system (BTS) 120. At call setup, the base station and mobile negotiate a maximum agreed R-SCH rate. The mobile device 110 will not exceed this rate, even if the CPU and reverse link power budget allow for it. In one aspect of the request, the mobile device performs a calculation for a maximum R-SCH rate it can support (that is within the negotiated maximum rate at call setup). This maximum data rate is then one of the parameters that is then sent to the BTS 120 using the SCRM message.

Various parameters form part of the calculation for the uplink data rate that a mobile device can handle. One of the inputs to the calculation is a parameter called TX_EXTRA_GAIN. TX_EXTRA_GAIN is the power budget left to transmit a given data rate on reverse supplemental channel. This TX_EXTRA_GAIN parameter depends on three items, namely TX_POWER_LIMIT, TX_OPEN_LOOP_POWER and TX_AGC_ADJ. The third parameter, namely TX_AGC_ADJ is a parameter that measures the network conditions, and specifically a closed loop correction value for the network conditions.

Conventionally, an instantaneous value of close-loop correction is sampled to determine a reverse supplemental channel (R-SCH) data rate. The sampling can occur, for example, every 20 ms. The instantaneous value is thus utilized in determining the rate of data transmission.

In test scenarios, closed loop correction can swing widely, especially when in an area of marginal radio frequency (RF) coverage. An instantaneous determination of channel conditions based on closed loop correction for the parameter TX_AGC_ADJ may lead a mobile device to a conclusion that channel conditions are worse than they actually are. The data rate requested is then less than the data rate allowed based on the actual channel conditions.

Figure 2:
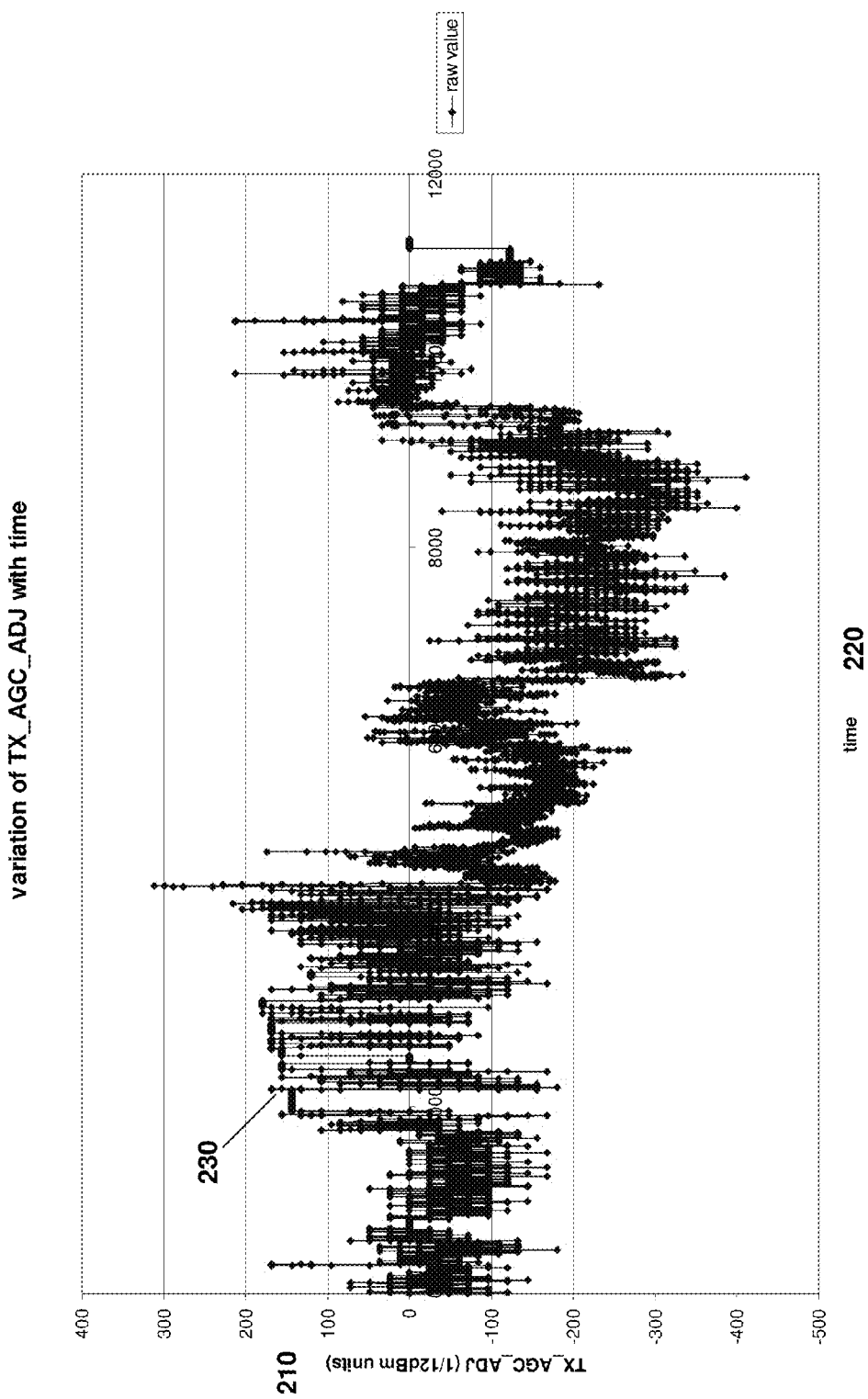
FIG. 2 is a graph showing instantaneous closed loop correction parameter values over time.

Reference is now made to FIG. 2. FIG. 2 illustrates a plot of the network conditions for closed loop correction. In the FIG. 2, the closed loop correction parameter TX_AGC_ADJ 210, as measured in $1/12^{th}$ dBm units, is shown on the vertical axis, and time 220 is shown on the horizontal axis. The raw value 230 is shown in the plot of FIG. 2 to vary widely under the marginal RF scenario of FIG. 2.

Sampling every 20 milliseconds for an instantaneous value of the closed loop correction can result in dramatically varied results. Specifically, values change quickly, and thus a sample may show network conditions to be significantly worse than they actually are.

The present disclosure provides for filtering of channel conditions in order to provide a better determination of channel conditions. In particular, various filters including a moving average or an infinite impulse response (IIR) may be utilized to provide a better reflection of channel conditions. By utilizing the filtered closed loop correction parameter, the data rate for the device is closer to the real data rate allowed, thus leading to better performance of the device.

A first option for a filter is a "moving average filter". As will be appreciated by those in the art, the moving average filter takes samples over a preceding period of time and averages the samples. For example, the moving average filter might average the preceding ten or twenty samples.

The present disclosure provides for the substitution of the instantaneous TX_AGC_ADJ value with the filtered value determined by the moving average filter calculation.

The present disclosure is not limited by any number of samples that need to be used for the moving average. In particular, ten samples taken every twenty milliseconds may be sufficient for removing wild swings out of the closed loop correction values. However, depending on network set-ups the value could be optimized using field testing, for example.

Figure 3:
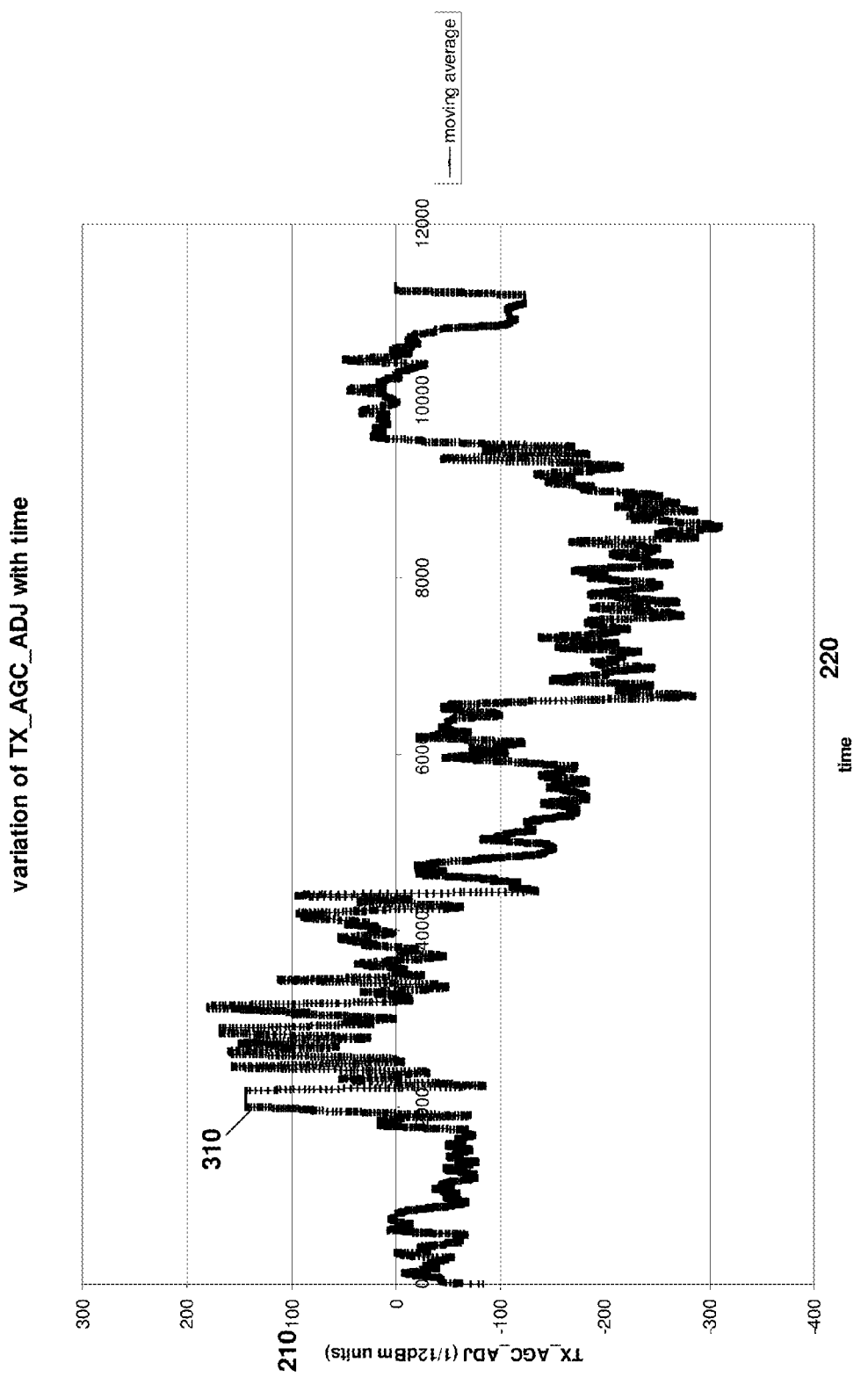
FIG. 3 is a graph showing closed loop correction parameter values over time when smoothed by a moving average filter.

Referring to FIG. 3, a filtered response to FIG. 2 is shown as a moving average plot 310, using a moving average filter. In the example of FIG. 3, the moving average filter has a sample size of 50 samples (e.g. past 50 samples). However, this is not meant to be limiting and as indicated above, other applications of the moving average filter could utilize different sample sizes. As seen in FIG. 3, the wild fluctuations of FIG. 2 are smoothed out to provide a better result.

The TX_EXTRA_GAIN parameter is then calculated with the filtered TX_AGC_ADJ value, ultimately leading to a data rate being sent in the SCRM message. The data rate sent is more reflective of the channel conditions than an instantaneous power value being used for the data rate.

In an alternative embodiment, instead of using a moving average filter, an infinite impulse response filter (IIR filter) may be used. Using an IIR filter, the following formula may be utilized;

new_filtered_value=((old_filtered_val*(len−1))+ new_sample)/len

Where new_filtered_value=the output of the filter;
len=the length of the filter;
new_sample=latest sample to filter in; and
old_filtered_val=output of the filter in previous invocation of the filter.

Using the IIR filter instead of the moving average filter, a value that is not significantly dependent on wild fluctuations is used in the data rate calculation.

Figure 4:
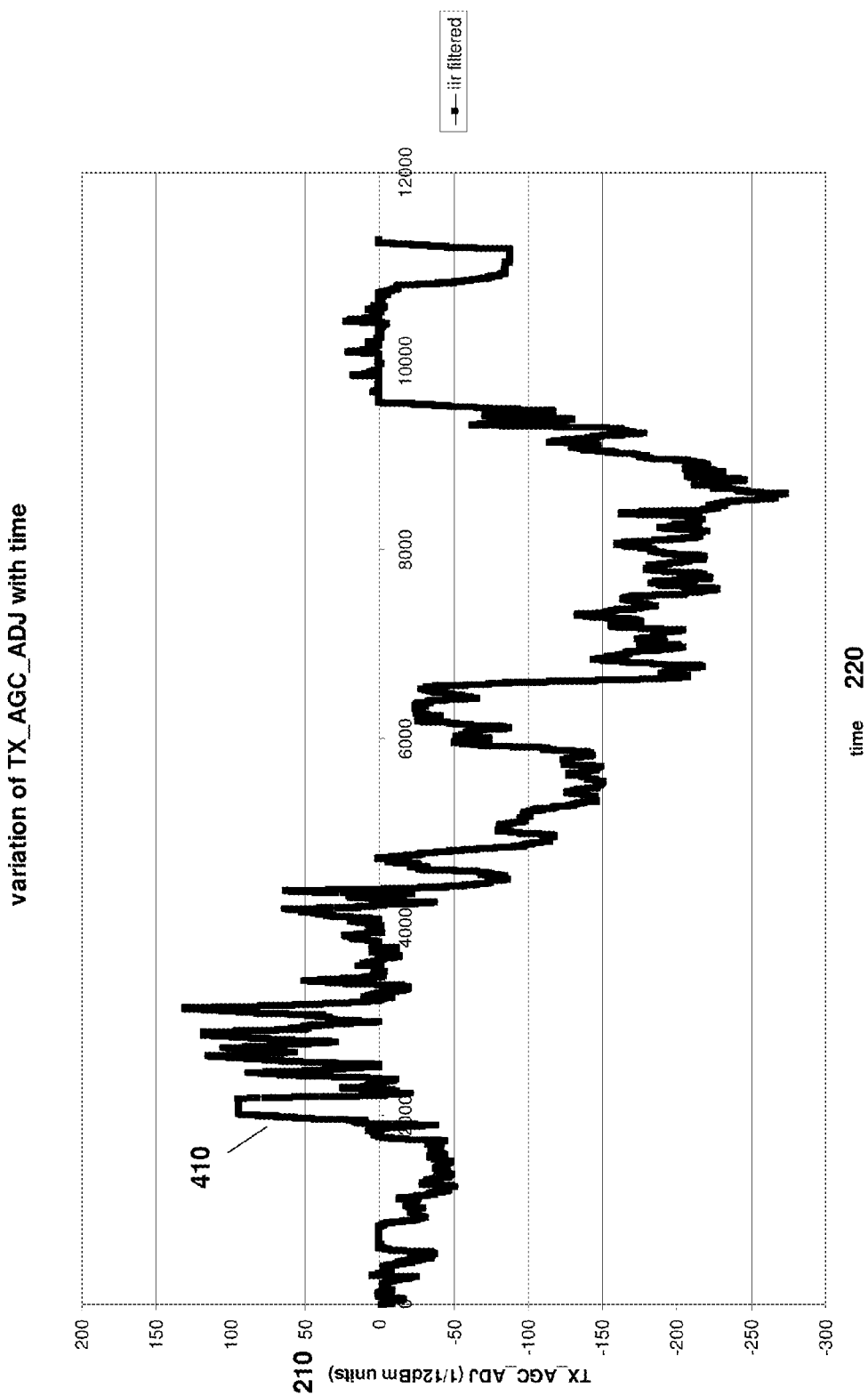
FIG. 4 is a graph showing closed loop correction parameter values over time when smoothed by a IIR filter.

Referring to FIG. 4, a filtered response to FIG. 2 using an IIR filter is shown as IIR filter plot 410. As seen in FIG. 4, the wild fluctuations of FIG. 2 are smoothed out to provide for a better result.

Figure 5:
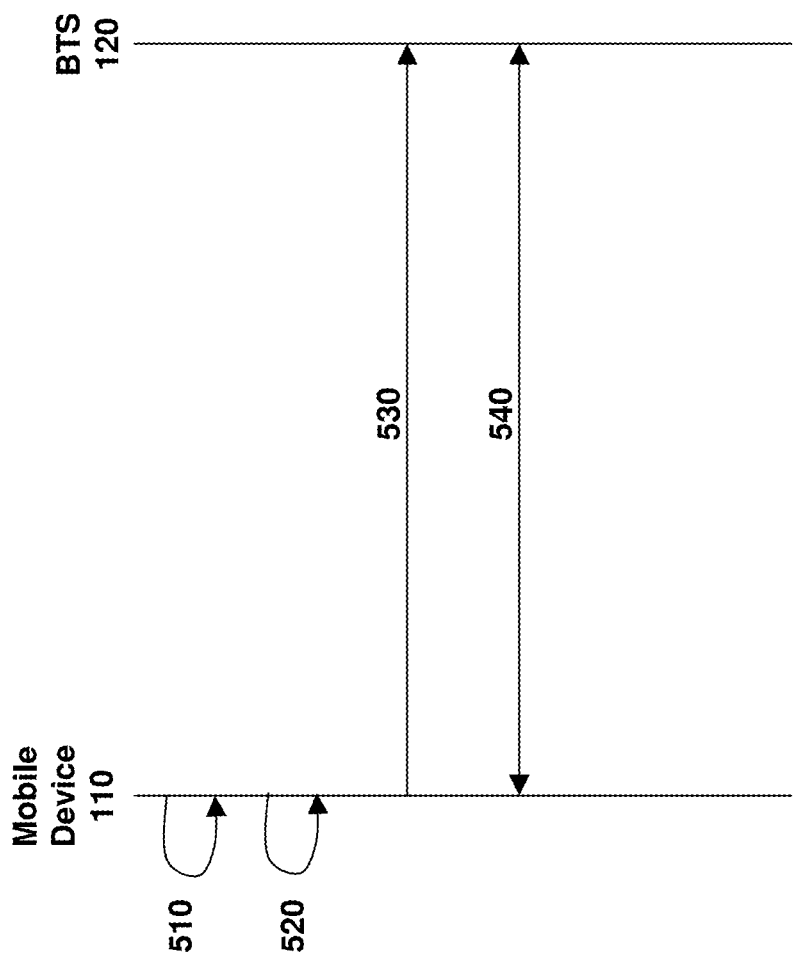
FIG. 5 is a data flow diagram showing interaction between a mobile device and BTS for instantaneous closed loop correction parameter values.

Reference is now made to FIG. 5. Depending on the system, every one to five seconds an SCRM message needs to be sent to a network with a data rate suitable for the mobile device. According to conventional implementations, as illustrated in FIG. 5, the mobile device 110 calculates an instantaneous closed loop correction parameter value at arrow 510.

At arrow 520 the parameter is utilized to calculate a data rate that mobile 110 can support.

Mobile 110 then sends an SCRM message 530 to BTS 120.

In response to receiving SCRM message 530, BTS 120 negotiates a R-SCH channel data rate with mobile device 110, as seen by arrow 540.

As will be appreciated by those skilled in the art, when marginal RF conditions exist, the instantaneous value found in block 510 could lead to the data rate calculated in block 520 to be much lower than mobile device 110 can actually support. In this case, mobile device 110 has a data rate fixed for one to five seconds at a rate that is lower than desired, leading to performance issues.

Figure 6:
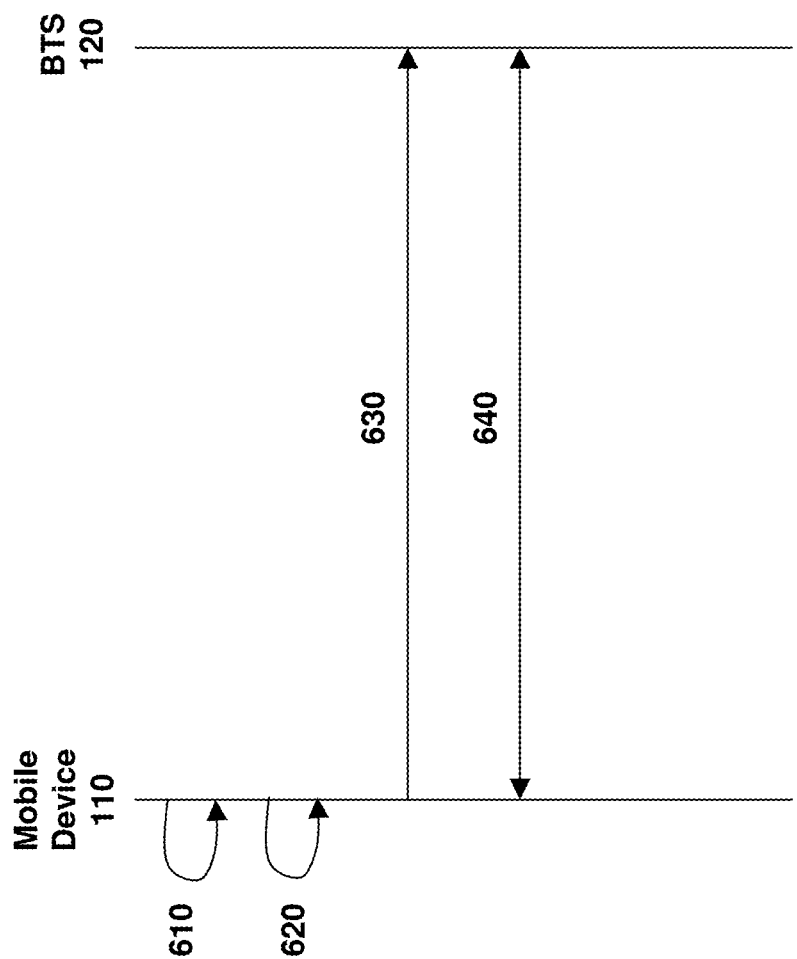
FIG. 6 is a data flow diagram showing interaction between a mobile device and BTS for filtered closed loop correction parameter values.

Reference is now made to FIG. 6. FIG. 6 illustrates a mobile device 110 communicating with BTS 120. In FIG. 6, a filtered close loop correction is calculated at arrow 610. The filter used could be the moving average or IIR filters described above, or other similar filter. The filtered value is then utilized to calculate a data rate, as shown at arrow 620.

Mobile device 110 sends an SCRM message 630 to BTS 120, where SCRM message 630 contains the requested data rate.

Based on message 630, BTS 120 negotiates a reverse supplemental channel with mobile device 110, as shown at arrow 640.

In the case of FIG. 6, a more accurate data rate can be calculated for the mobile device 110. In particular, the use of the filtered value at arrow 610 provides a more accurate description of network conditions. If network conditions are improving, a higher data rate can be supported by the mobile device 110. Conversely, if network conditions are degrading, the mobile device 110 could support a lower data rate.

Further, the performance of a device using the filtered value more closely matches the performance of devices that do not properly implement SCRM. Devices not properly implementing SCRM may, for example, provide inaccurate data rates back to the BTS 120, contrary to the requirements under CDMA.

Figure 7:
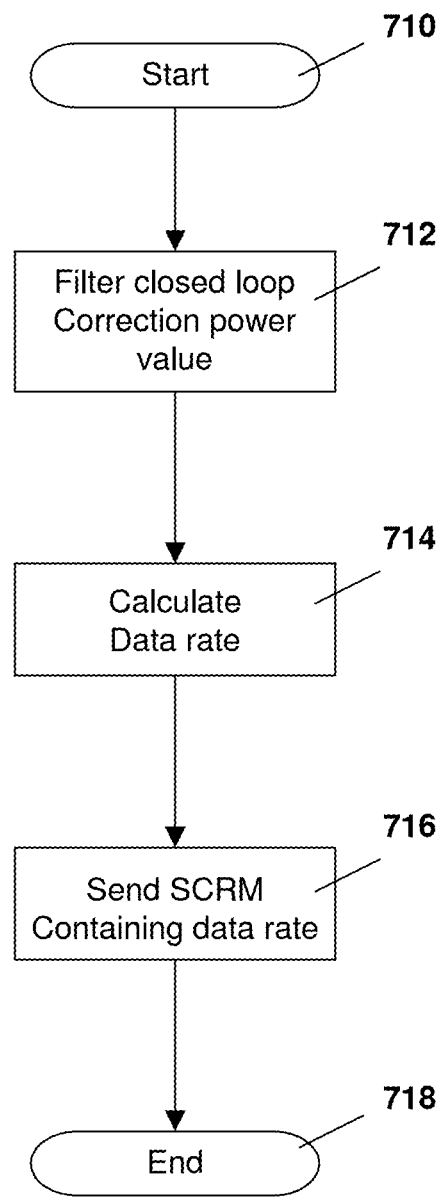
FIG. 7 is a flow chart showing a mobile device side process for providing a data rate based on a value corresponding to filtered network conditions.

From a mobile device perspective, an exemplary process is shown with regard to FIG. 7. In FIG. 7 the process starts at block 710 and proceeds to block 712. At block 712 a closed loop correction power value is filtered, as described above.

From block 712 the process proceeds to block 714. At block 714, a data rate is calculated based on the filtered closed loop correction power value found at block 712.

From block 714 the process then proceeds to block 716 in which a SCRM is sent to the network, where the SCRM contains the data rate calculated at block 714. From block 716 the process proceeds to block 718 and ends.

Any mobile device can be used with the method and system described herein. An exemplary mobile device described with reference to FIG. 8 below.

Mobile device 800 is generally a two-way wireless communication device having at least voice and data communication capabilities. Mobile device 800 may have the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 800 is enabled for two-way communication, it may incorporate a communication subsystem 811, including both a receiver 812 and a transmitter 814, as well as associated components such as one or more, preferably embedded or internal, antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate.

Network access requirements may also vary depending upon the type of network 819. In some CDMA networks network access is associated with a subscriber or user of mobile device 800. A CDMA mobile device may require a removable user identity module (RUIM) or a subscriber identity module (SIM) card in order to operate on a CDMA network. The SIM/RUIM interface 844 is normally similar to a card-slot into which a SIM/RUIM card can be inserted and ejected like a diskette or PCMCIA card. The SIM/RUIM card can have approximately 64K of memory and hold many key configuration 851, and other information 853 such as identification, and subscriber related information.

Figure 8:
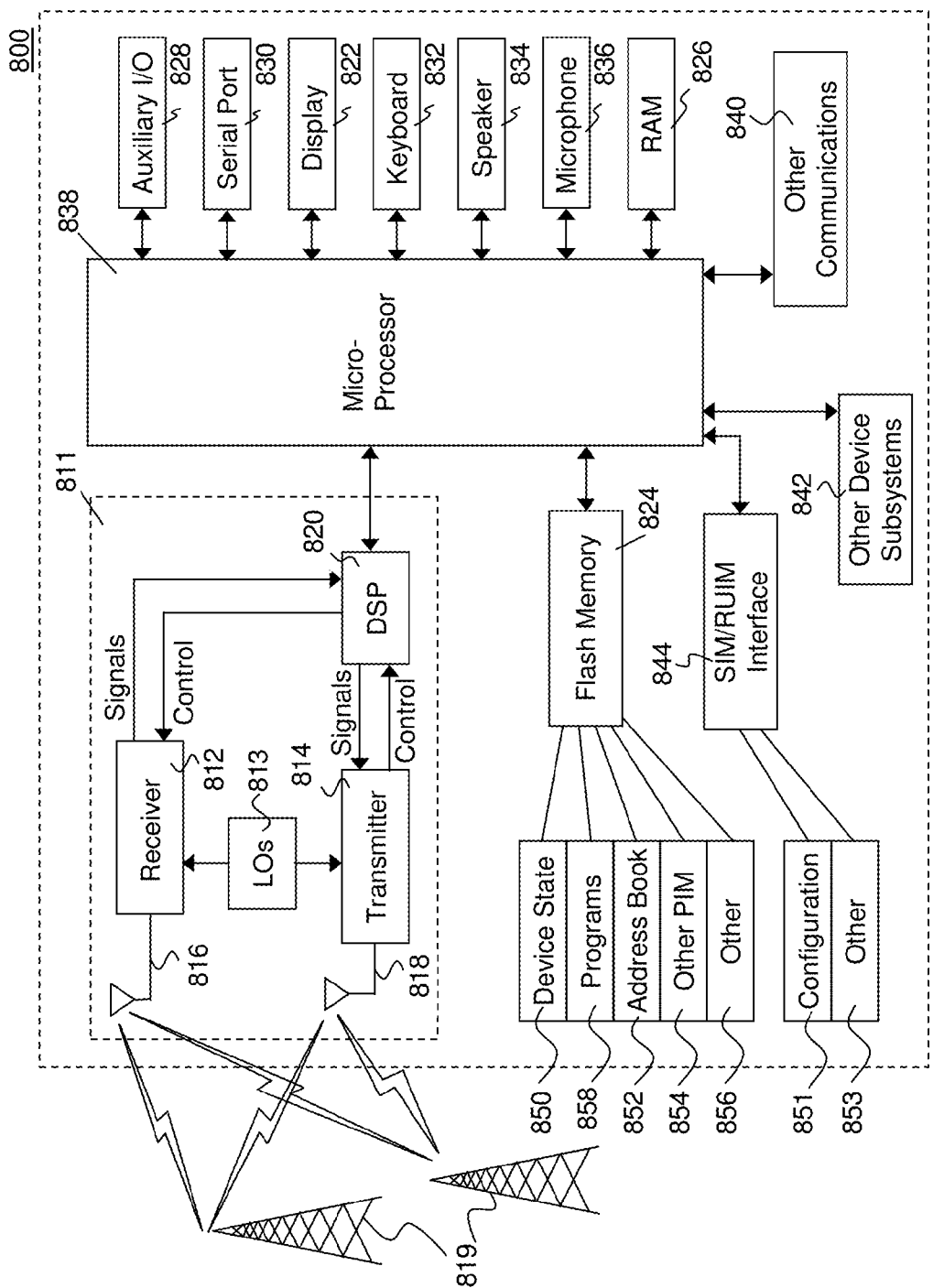
FIG. 8 is a block diagram of a exemplary mobile device capable of being used with the present system

When network registration or activation procedures have been completed, mobile device 800 may send and receive communication signals over the network 819. As illustrated in FIG. 8, network 819 can consist of multiple base stations communicating with the mobile device. For example, in a hybrid CDMA 1× EVDO system, a CDMA base station and an EVDO base station communicate with the mobile station and the mobile device is connected to both simultaneously. The EVDO and CDMA 1× base stations use different paging slots to communicate with the mobile device.

Signals received by antenna 816 through communication network 819 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile device 800 typically includes a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 could include a USB port or other port known to those in the art.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 may bestored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the mobile device. A predetermined set of applications that control basic operations, including at least data and voice communication applications for example, will normally be installed on mobile device 800 during manufacturing. Other applications could be installed subsequently or dynamically.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 819. In one embodiment, the PIM data items are seamlessly integrated, synchronized and updated, via the wireless network 819, with the mobile device user's corresponding data items stored or associated with a host computer system. Further applications may also be loaded onto the mobile device 800 through the network 819, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the mobile device 800.

In a data communication mode, a received signal such as a text message or web page download will be processed by the communication subsystem 811 and input to the microprocessor 838, which generally further processes the received signal for output to the display 822, or alternatively to an auxiliary I/O device 828.

A user of mobile device 800 may also compose data items such as email messages for example, using the keyboard 832, which is preferably a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of mobile device 800 is similar, except that received signals may be output to a speaker 834 and signals for transmission may be generated by a microphone 836. Alternative voice or audio I/O subsystems, such as a voice message recording subsystem, may also be implemented on mobile device 800.

Although voice or audio signal output is preferably accomplished primarily through the speaker 834, display 822 may also be used to provide an indication of the identity of a calling party, the duration of a voice call, or other voice call related information for example.

Serial port 830 in FIG. 8 would normally be implemented in a personal digital assistant (PDA)-type mobile device for which synchronization with a user's desktop computer (not shown) may be desirable, but is an optional device component. Such a port 830 would enable a user to set preferences through an external device or software application and would extend the capabilities of mobile device 800 by providing for information or software downloads to mobile device 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the mobile device to a computer to act as a modem.

Other communications subsystems 840, such as a short-range communications subsystem, is a further optional component which may provide for communication between mobile device 800 and different systems or devices, which need not necessarily be similar devices. For example, the subsystem 840 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for obtaining reverse channel resources for a mobile device comprising:
    filtering a closed loop correction power value, the closed loop correction power value being a closed loop correction value for network conditions (TX_AGC_ADJ) for a code division multiple access network;
    calculating a data rate utilizing the filtered closed loop correction power value, the calculating including calculating a power budget value (TX_EXTRA_GAIN) using the TX_AGC_ADJ value; and
    sending a supplemental channel request message, including the calculated data rate, to a base station transceiver system.

2. The method of claim 1, wherein the filtering utilizes a moving average filter.

3. The method of claim 2, wherein the moving average filter uses a sample set of between 10 and 50 samples.

4. The method of claim 3, wherein each sample is taken at an interval of 20 milliseconds.

5. The method of claim 1, wherein the filtering uses an infinite impulse response filter.

6. The method of claim 5, wherein the infinite impulse response filter calculates a new filtered value being equal to a filter length minus 1, times an output of the filter in a previous invocation of the filter, plus a new sample, all divided by the filter length.

7. The method of claim 1, wherein the data rate is calculated for a reverse supplemental channel.

8. The method of claim 1, wherein the mobile device utilizes a radio technology selected from a Global System for Mobile communications radio technology, a Code Division Multiple Access radio technology, a Universal Mobile Telecommunications System radio technology or a Long Term Evolution radio technology.

9. A mobile device configured to obtain reverse channel resources, the mobile device comprising:
    a processor configured to:
        filter a closed loop correction power value, the closed loop correction power value being a closed loop correction value for network conditions (TX_AGC_ADJ) for a code division multiple access network; and
        calculate a data rate utilizing the filtered closed loop correction power value, the calculating including calculating a power budget value (TX_EXTRA_GAIN) using the TX_AGC_ADJ value; and
    a communications subsystem configured to send a supplemental channel request message, including the calculated data rate, to a base station transceiver system.

10. The mobile device of claim 9, wherein the processor utilizes a moving average filter.

11. The mobile device of claim 10, wherein the moving averaged filter uses a sample set of between 10 and 50 samples.

12. The mobile device of claim 11, wherein each sample is taken at an interval of 20 milliseconds.

13. The mobile device of claim 9, wherein the processor uses an infinite impulse response filter.

14. The mobile device of claim 13, wherein the infinite impulse response filter calculates a new filtered value being equal to a filter length minus 1, times an output of the filter in a previous invocation of the filter, plus a new sample, all divided by the filter length.

15. The mobile device of claim 9, wherein the data rate is calculated for a reverse supplemental channel.

16. The mobile device of claim 9, wherein the mobile device utilizes a radio technology selected from a Global System for Mobile communications radio technology, a Code Division Multiple Access radio technology, a Universal Mobile Telecommunications System radio technology or a Long Term Evolution radio technology.

* * * * *